(12) United States Patent
Hirono et al.

(10) Patent No.: US 8,300,154 B2
(45) Date of Patent: Oct. 30, 2012

(54) TELEVISION RECEIVER

(75) Inventors: Takao Hirono, Chigasaki (JP); Manabu Nozue, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 416 days.

(21) Appl. No.: 12/615,413

(22) Filed: Nov. 10, 2009

(65) Prior Publication Data

US 2010/0225813 A1    Sep. 9, 2010

(30) Foreign Application Priority Data

Mar. 3, 2009  (JP) .................................. 2009-048894

(51) Int. Cl.
*H04N 5/63* (2006.01)
(52) U.S. Cl. ..................... 348/730; 348/554; 348/731
(58) Field of Classification Search .................. 348/730, 348/552–555, 734, 714–721, 725, 790, 705–706, 348/729, 558, 731; *H04N 5/63*
See application file for complete search history.

(56) References Cited

U.S. PATENT DOCUMENTS

| 7,468,755 B2 * | 12/2008 | Ando ............................ 348/553 |
| 8,026,982 B2 * | 9/2011 | Han et al. ...................... 348/730 |
| 2008/0030624 A1 * | 2/2008 | Chang .......................... 348/730 |

FOREIGN PATENT DOCUMENTS

JP      2002-328670      11/2002

* cited by examiner

*Primary Examiner* — Trang U Tran

(74) *Attorney, Agent, or Firm* — Antonelli, Terry, Stout & Kraus, LLP.

(57) ABSTRACT

A television receiver cuts power supply to its built-in device which is overlapped with that of the external unit connected to the television receiver for reducing power consumption to cope with diversification of the external unit. The television receiver includes the tuner which receives a television broadcast signal, an external unit connection portion which connects the external unit with the HDMI cable, the HDMI process unit which acquires unit information data from the connected external unit to transmit video/audio data, and the power supply circuit which supplies power to the tuner. If the HDMI process unit determines that the connected external unit includes the same function as the tuner, the control unit allows the power supply circuit to stop power supply to the tuner.

5 Claims, 4 Drawing Sheets

FIG. 2

| Address | Device |
|---------|--------|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

TELEVISION RECEIVER

CLAIM OF PRIORITY

The present application claims priority from Japanese patent application serial No. JP2009-048894, filed on Mar. 3, 2009, the content of which is hereby incorporated by reference into this application.

BACKGROUND OF THE INVENTION (1) Field of the Invention

The present invention relates to a television receiver for receiving a television broadcasting, and more particularly to a technology for reducing power consumed by the receiver operated in connection with an external unit.

(2) Description of the Related Art

The television receiver has been increasingly structured to have a built-in data storage device such as HDD and DVD for the purpose of realizing the multifunctional device. Meanwhile, various types of receiver systems may be structured adapted to the user's viewing environment, for example, the television receiver having the receiver unit (tuner) separated from the display unit (monitor) to allow free layout, and the receiver connected to the set top box (STB) and the other AV equipment for receiving the cable television broadcasting.

In the receiver system as described above, there may be the case where plural devices each having the same function such as tuners are installed as overlapping components of the system. When the respective components are turned ON, power will be supplied to the overlapping devices. There is no problem if the overlapping devices are used for different usages, respectively. However, if the overlapping devices are used for the same usage, power to be supplied to any one of the overlapping devices may be wasted. In such a case, the power supply to one of those devices may be stopped to reduce power consumption of the television receiver.

Japanese Published Unexamined Patent Application No. 2002-328670 discloses the related art as described above for reducing the power consumption of the electronic equipment with a built-in display unit to be used in connection with the external control unit (personal computer) provided with the display unit. For the purpose of realizing the technology, the electronic equipment includes a detachment determination unit for determining whether or not the external control unit is connected to the connector, a power source ON/OFF detection unit for detecting ON/OFF state of a power switch of the external control unit, and a communication detection unit for detecting communication/non-communication between the external control unit and the microprocessor.

SUMMARY OF THE INVENTION

The tuner, monitor, speaker, HDD and DVD may be considered as the device having the function commonly used both in the television receiver and the external unit connected thereto. The aforementioned type of the device will further be diversified, and it is therefore expected to realize home networking with varied system structure. As the interface for connecting the components, an HDMI (High-Definition Multimedia Interface) standard capable of transmitting the control signal with digital video/audio signals has been employed as the recent trend. As the control protocol between the components, a CEC (Consumer Electronics Control) communication protocol is specified for the HDMI. In view of the diversified receiver system as described above, it is highly demanded to reduce power consumption of the television receiver further rationally. In the system to which plural external units are connected, the determination is made with respect to existence of the device which overlaps with the one installed in the television receiver so as to stop power supply to the overlapping device.

In Japanese Published Unexamined Patent Application No. 2002-328670, it is assumed that the external control unit (personal computer) is connected to the electronic equipment (main unit) definitely. If the external unit except the one as described above is connected, a detachment determination unit or the like has to be newly added. Japanese Published Unexamined Patent Application No. 2002-328670 makes no consideration with identification of the type of the external unit to be connected, resulting in inconvenience which fails to commonly use the single connector (cable) for connecting plural external units.

The present invention provides a television receiver for reducing the power consumption by turning off the power source of the device built-in the receiver, which is overlapped with the device built in the external unit to be connected for coping with diversification of the external unit.

The television receiver according to the present invention includes a tuner which receives a television broadcast signal to select a channel, a video/audio process circuit which generates a video/audio signal by processing the broadcast signal of the selected channel, an external unit connection portion which connects an external unit using a high-definition multimedia interface (HDMI) cable, an HDMI process unit which acquires device information from the connected external unit, and communicates with the external unit with respect to video/audio data, a power supply circuit which supplies power to the tuner, and a control unit which controls the HDMI process unit and the power supply circuit. When the HDMI process unit determines that the connected external unit has the same function as that of the tuner, the control unit allows the power supply circuit to stop the power supply to the tuner.

When the HDMI process unit determines that the connected external unit includes a function other than the tuner, the control unit allows a user to select one of the tuners of the television receiver and the external unit, and allows the power supply circuit to stop the power supply to the tuner of the television receiver when the user selects the external unit.

The television receiver further includes at least one of devices including a monitor, a speaker, an HDD and a DVD in addition to the tuner, and a power supply circuit which supplies power to the device individually. When the HDMI process unit determines that the connected external unit has the same function as that of the device, the control unit controls the power supply circuit to stop supplying power to the device which has the function overlapped with that of the external unit.

The present invention allows the power consumption to be rationally reduced by cutting the power supply to the device having the overlapping operations for coping with diversification of the external unit to be connected.

BRIEF DESCRIPTION OF THE DRAWINGS

These and other features, objects and advantages of the present invention will become more apparent from the following description when taken in conjunction with the accompanying drawings wherein:

FIG. 2 is a view showing each definition of the logical addresses specified by the CEC protocol;

DETAILED DESCRIPTION OF THE EMBODIMENTS

Figure 1:
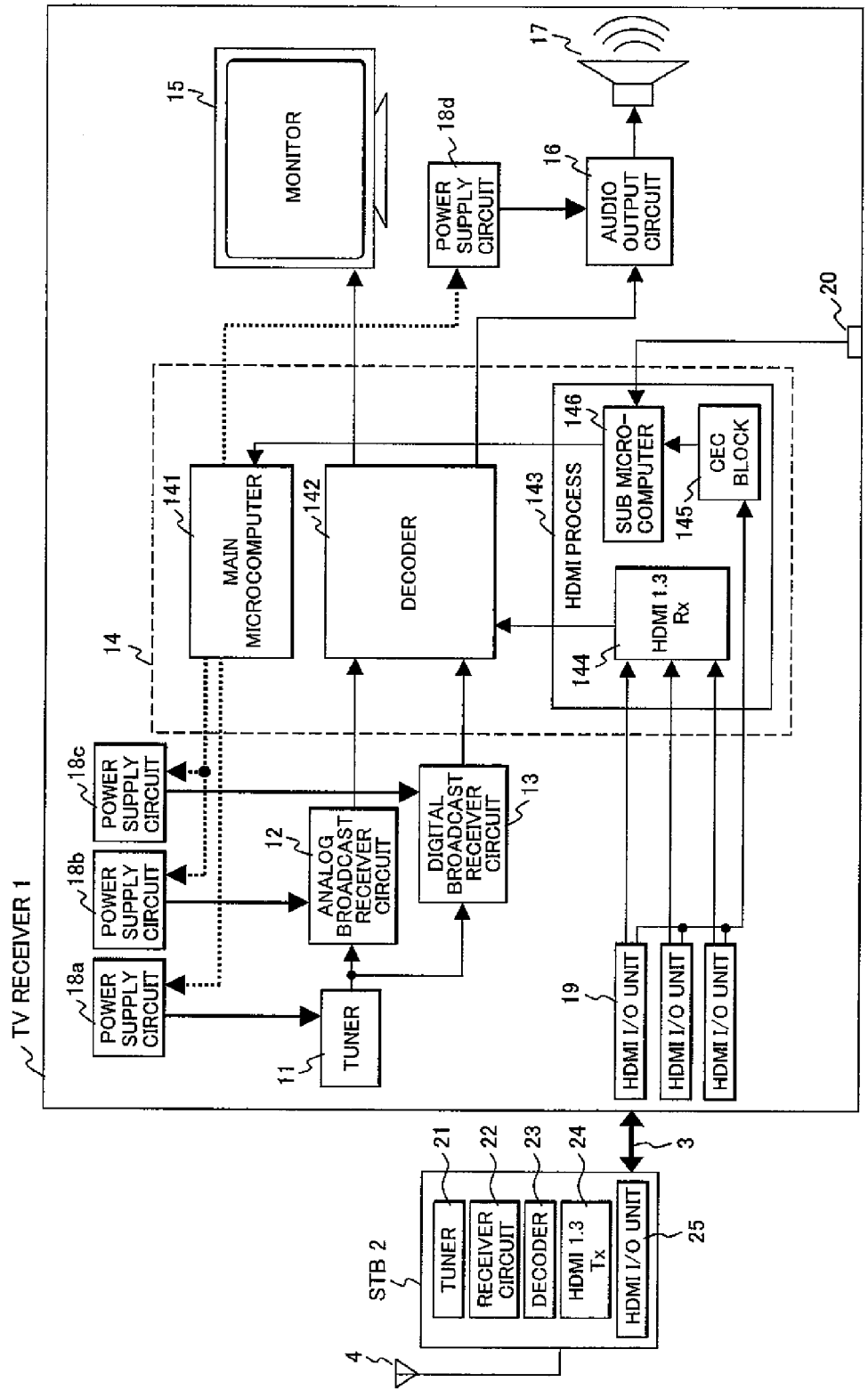
FIG. 1 is a block diagram showing an exemplary structure of a television receiver 1 according to the present invention.

An embodiment of the present invention will be described referring to the drawings. In the embodiment, overlapping devices as tuners, that is, the tuner built in the television receiver and the tuner of the set top box connected as the external unit will be described for simplifying the explanation.

FIG. 1 is a block diagram showing a structure of a television receiver 1 according to an embodiment of the present invention.

The television receiver 1 includes a tuner 11, an analog broadcast receiver circuit 12, a digital broadcast receiver circuit 13, a signal processing circuit block 14, a monitor 15, an audio output circuit 16, a speaker 17, power supply circuits 18a to 18d, an HDMI I/O unit 19, and a remote control light receiving unit 20. The signal processing circuit block 14 includes a main microcomputer (control section) 141, a decoder 142, and an HDMI process unit 143.

The tuner 11 receives a television broadcast signal corresponding to a required channel in synchronization therewith. The received television broadcast signal as an analog broadcast signal is transmitted to the analog broadcast receiver circuit 12 so as to be subjected to an intermediate frequency conversion and demodulation, and is further transmitted to a not shown A/D converter so as to be converted into a digital signal. Meanwhile, the received television broadcast signal as a digital broadcast signal is transmitted to the digital broadcast receiver circuit 13 so as to be subjected to the intermediate frequency conversion and demodulation. The signal received and demodulated by the respective receiver circuits 12 and 13 are supplied to the decoder 142.

In the embodiment, the decoder 142 includes a decoding unit for decoding and extending a compression coded video signal, and a signal processor unit for executing various types of video processing. The signal processor unit subjects the video signal to such process as an interlace/progressive conversion (scan conversion), a pixel number conversion, a frame rate conversion, an adjustment of contrast, gamma and brightness, and a color correction.

The digitized video signal from the analog broadcast receiver circuit 12 is subjected to various types of video processing by the signal processor unit of the decoder 142 without being transmitted to the decoding unit. An audio signal is subjected to various types of audio processing in case of necessity (for example, conversion of the audio channel number). Meanwhile, the digital broadcast signal has been compression coded by an MPEG-2, for example. So the decoding unit of the decoder 142 decodes and extends the compression coded signal output from the digital broadcast receiver circuit 13 for generating a non-compression video/audio signal. The decoded video signal is subjected to various types of video processing in the aforementioned signal processor unit. The audio signal is subjected to various types of audio processing (for example, conversion of the audio channel number) in case of necessity.

The video signal which has been subjected to various types of processing in the decoder 142 is displayed on the monitor 15 such as a liquid crystal display (LCD) and a plasma display (PDP). The audio signal is converted into an analog signal by the audio output circuit 16, and is further subjected to a volume adjustment and supplied to the speaker 17. The speaker 17 then outputs the audio sound based on the audio signal from the audio output circuit 16.

The HDMI process unit 143 processes the digital video/audio data to be transmitted to/received from the external unit in accordance with the HDMI standard, and controls the connected external unit by generating a CEC message so as to acquire the unit information (the logical address and the physical address of the external unit specified by the HDMI standard).

More specifically, the HDMI process unit 143 allows an HDMI receiver (HDMI Rx) 144 to receive the video/audio data which have been transmitted from an STB 2 to be described later via an HDMI cable 3 and input to the HDMI I/O unit 19 as an input terminal. The video/audio data transmitted via the HDMI cable 3 are non-compression stream data with a predetermined data structure conforming to the HDMI standard. The HDMI receiver 144 decodes the stream data with the predetermined data structure conforming to the HDMI standard so as to be supplied to the decoder 142. The decoder 142 then allows a video processor unit to subject the signal received by the HDMI receiver 144 to the predetermined video processing without being transmitted to the decoding unit.

The HDMI cable 3 includes a CEC line for communicating the CEC message, which is connected to a CEC block 145. The CEC block 145 is connected to a sub microcomputer 146 which inputs a remote control signal from a remote control (not shown) received by the remote control light receiving unit 20, and analyzes a command transmitted in the remote control signal. If the command received by the remote control light receiving unit 20 is the one for controlling the television receiver 1, the sub microcomputer 146 supplies the command to the main microcomputer 141 for controlling the respective components. The command for controlling the television receiver 1 may be issued to turn the television receiver 1 ON/OFF, switch the channel, adjust the volume and the like.

Meanwhile, if the command of the remote control signal received by the remote control light receiving unit 20 is the one for controlling the STB 2 connected to the HDMI cable 3, the sub microcomputer 146 transmits the command to the CEC block 145. The CEC block 145 then transmits the command to the STB 2 via the CEC line as the CEC message. The command for controlling the STB 2 may be issued to turn power of the STB ON/OFF, switch the channel and the like.

Referring to FIG. 1, the remote control light receiving unit 20 is located apart from the monitor 15. However, it is generally located below the monitor 15.

The CEC block 145 transmits the CEC message which contains the command, for example, transmitted from the STB 2 via the CEC line to the main microcomputer 141 via the sub microcomputer 146.

The CEC block 145 may further be employed for transmitting/receiving various kinds of external unit information data for setting the logical address and the physical address in the HDMI network (network formed of plural units connected with the HDMI cable 3). The logical address and the physical address will be described in detail later.

The power supply circuits 18a to 18d individually supply power to the respective circuits in the receiver. The main microcomputer (control unit) 141 controls various components such as the tuner 11 and the power supply circuits based on the command of the remote control signal input to the sub microcomputer 146. The main microcomputer further controls the power supply circuits 18a to 18d individually to turn the power supply ON/OFF using the CEC message based on the external unit information acquired by the HDMI process unit 143.

As described above, the STB (set top box) 2 is connected to the television receiver 1 as the external unit via the HDMI cable 3. The HDMI I/O units 19 and 25 are I/O terminals for the television receiver 1 and the STB 2, respectively. The STB 2 receives compression coded digital and analog television broadcast signals which have been received by an antenna 4. The required channel is selected by the tuner 21. Both the analog and the digital broadcast signals are respectively subjected to the intermediate frequency conversion and demodulation by a receiver circuit 22 which is the same as the analog broadcast receiver circuit 12 and the digital broadcast receiver circuit 13 (those circuits are integrated in FIG. 1 for simplifying the view). The analog broadcast signal is further converted into the digital signal by a not shown A/D converter after demodulation. The signal from the receiver circuit 22 is supplied to the decoder 23. If the digital broadcast signal is received, the compression coded digital broadcast signal is decoded and extended by the decoder 23 to produce the non-compression video/audio signal. The decoding process as described above is not performed upon reception of the digital broadcast signal. The video/audio signal from the decoder 23 is input to an HDMI transmitter (HDMI Tx) 24 where the non-compression video/audio signal data are converted into stream data with the predetermined structure specified by the HDMI standard. The data are then transmitted to the television receiver 1 via an HDMI I/O unit 25 as the output terminal and the HDMI cable 3.

The HDMI standard employs TMDS (Transition Minimized Differential Signaling) transmission technology, which allows the single HDMI cable 3 to transmit the video, audio and control signals. The HDMI standard specifies the CEC (Consumer Electronics Control) as the protocol for transmitting the control signal bi-directionally. The use of the CEC protocol allows the single unit of the remote control to control plural devices by relaying the control signal with the device. In other words, the use of the single remote control allows operation of both the television receiver 1 and the STB 2.

In the embodiment, the television receiver 1 identifies the type of the external unit connected via the HDMI cable 3 using the information communicated in accordance with the CEC protocol of the HDMI. The embodiment allows confirmation whether the power is supplied to the external unit connected to the HDMI cable 3. If the external unit of the identified type has the device with the same function as the built-in unit (tuner 11 in the embodiment), and the power is supplied to the external unit, the power supply circuit 18*a* cuts power supply to the built-in tuner 11. When the tuner 21 of the STB 2 is used for reception, the power supply to the built-in tuner 11 is stopped for saving power.

The address information allocated to the component is used for mutually identifying the components connected via the HDMI cable 3. A DDC (Display Data Channel) bus as the unidirectional data connection is used for mapping the physical address so as to identify both the components and connection structure with the CEC protocol. The physical address denotes the identification number formed of 16-bit values divided into 4 sections each having 4 bits. It is expressed by arranging four decimal figures from 0 to 15, for example, "0.0.0.0". The physical address "0.0.0.0" as the root address is allocated to the television receiver 1 as the one with no HDMI output. For example, "1.0.0.0" is allocated to the unit connected via the HDMI cable 3 (STB 2 in the embodiment). If the HDD recorder is connected to the STB 2, the physical address "1.1.0.0" is allocated to the HDD recorder. If another unit (for example, DVD player) is connected to the television receiver 1 in parallel with the STB 2, the physical address of "2.0.0.0" is allocated to the DVD player. As described above, in reference to the television receiver 1, the physical addresses are set and allocated to the respective components in accordance with the correlation (hierarchy) with the television receiver 1.

After allocating the physical address, the CEC bus for bi-directional connection is used to perform mapping of the logical address for the bi-directional communication of the components. The logical address denotes the ID defining the unit category. The standard of the current version in the CEC of the HDMI allows the use of the figures from 0 to 15 as shown in FIG. 2, and of the only name in the HDMI network. The logical address is different depending on the type of the external unit.

FIG. 2 is a table showing definitions of the logical addresses specified by the CEC protocol. After allocating the physical addresses to the components of the HDMI network as described above, the process starts acquiring the logical address corresponding to the category of the subject unit. The acquisition of the logical address is realized by transmitting the polling message as one of the CEC messages to be transmitted with the CEC control signal. The explanation with respect to the polling message will be omitted. The television receiver 1 has the logical address "0" allocated indicating as being the "TV" device. The STB 2 has any one of the logical addresses "3", "6", "7" and "10" indicating as being the "Tuner" device. In the case where only the single unit of the STB is connected to the television receiver 1, the logical address "3" will be allocated to the STB 2. The logical address represents the type of the unit, which is allocated to the function on the CEC line one to one. The unit with plural functions may have plural logical addresses allocated to the respective functions.

Figure 3:
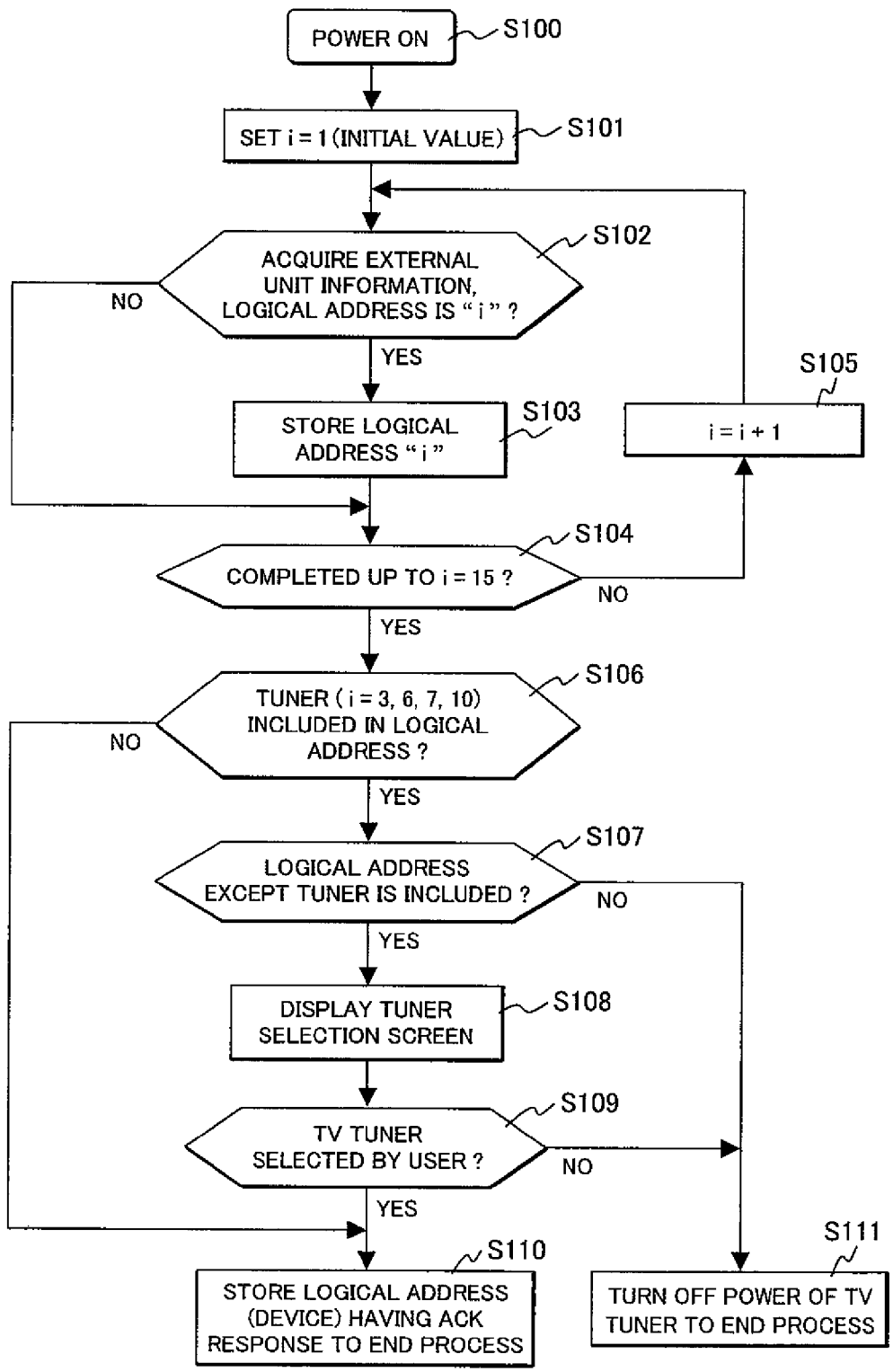
FIG. 3 is a flowchart representing a power control according to the embodiment.

FIG. 3 is a flowchart representing a routine of a power supply control according to the embodiment. The control to be described below is executed based on the command of the main microcomputer (control unit) 141.

In step S100, each power supply of the television receiver 1 and the external unit (STB 2) is turned ON.

In step S101, the HDMI process unit 143 sets a variable of the logical address value to an initial value "1". The logical address i=1 denotes the "Recording Device 1".

In step S102, the HDMI process unit 143 transmits the CEC message (polling message) to confirm whether the external unit with the logical address i=1 has been connected. If the external unit with the logical address i=1 has been connected, and the power supply is turned ON, the ACK response returns. In any of the cases where the external unit has not been connected, and it has been connected but the power supply has not been turned ON, the ACK response will not return. If the ACK response returns (Yes in S102), the process proceeds to step S103. If no ACK response returns (No in S102), the process proceeds to step S104.

In step S103, the logical address value i obtained when the ACK response returns is temporarily stored, and the process proceeds to step S104.

In step S104, it is determined whether setting of the variable i of the logical address up to 15 has been completed. If it has not been completed, the process proceeds to step S105 where the variable i is incremented by 1 to set i=2, and then the process returns to step S102. In step S102, it is confirmed whether the unit with the variable i=2 (Recording Device 2) has been connected.

The aforementioned operation is repeatedly executed until the variable i becomes 15. When setting of the variable i=15 is completed, the process proceeds to step S106. In the embodiment, the ACK response returns when the logical address is any one of 3, 6, 7 and 10, indicating that the "Tuner" has been connected as the external unit.

In step S106, it is determined whether the logical address having the ACK response received contains any one of the variables i=3, 6, 7 and 10 each indicating the tuner. If the logical address contains the variable as described above (Yes in step S106), the process proceeds to step S107. If the logical address does not contain the variable (No in step S106), the process proceeds to step S110.

In step S107, it is determined whether the device other than the tuner is contained in the logical address with the ACK response received. If the device is contained (Yes in step S107), the process proceeds to step S108. If it is not contained (No in step S107), the process proceeds to step S111.

Figure 4:
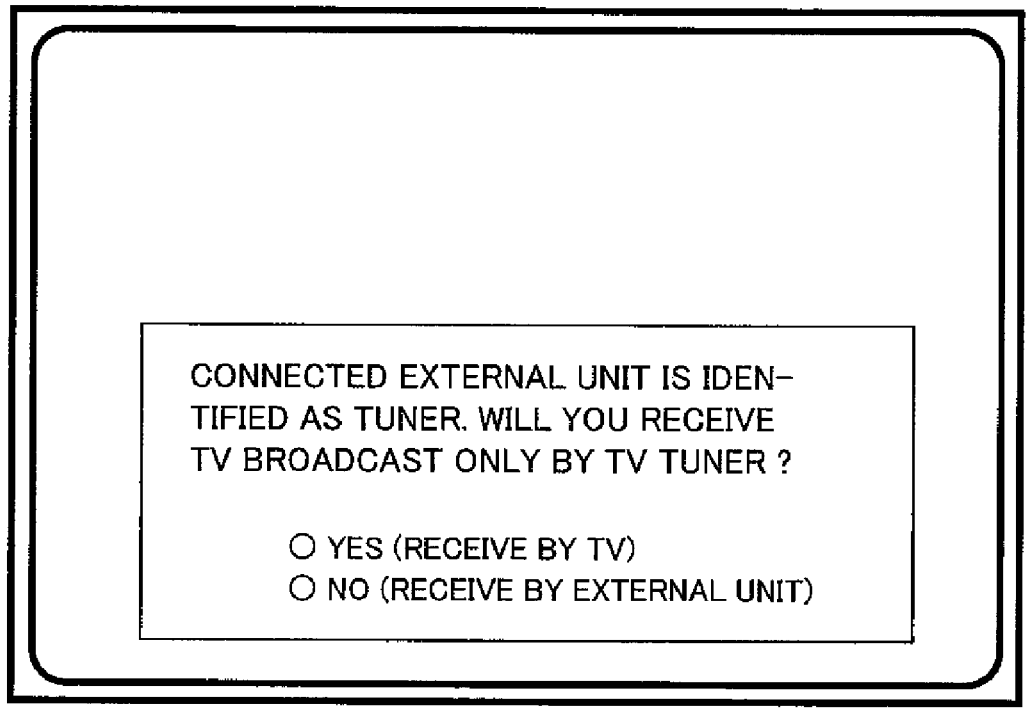
FIG. 4 is a view showing an exemplary screen for selecting the tuner.

In step S108, the monitor 15 displays the tuner selection screen for selection between the tuner of the external unit and the tuner of the television receiver. The exemplary selection screen is shown in FIG. 4.

In step S109, it is determined whether the user has selected the use of the tuner of the television receiver. If the user selects the tuner of the television receiver (Yes in step S109), the process proceeds to step S110. If the user selects the tuner of the external unit (No in step S109), the process proceeds to step S111.

In step S110, the logical address having the ACK response received (type of the external unit) is stored, and the process ends. The stored logical address may be used for controlling the external unit sequentially.

In step S111, the power supply circuits 18a to 18c are allowed to stop the power supply to the tuner 11, the analog receiver circuit 12 and the digital receiver circuit 13 of the television receiver, respectively and the process ends. In this case, if the power supply to the tuner 11 of the television receiver and the receiver circuits 12 and 13 of the television receiver are cut, the receiving function may be covered by the tuner 21 and the receiver circuit 22 of the external unit, causing no problem.

In the embodiment, it is determined whether the externally connected unit outside the television receiver unit 1 is provided with the function overlapped with the inner function of the television receiver 1, for example, the tuner, using the logical address (information with respect to the type of the external unit) in the CEC system of the HDMI. This makes it possible to cut or reduce the power consumed by the overlapping functions (inner function of the television receiver 1) in the HDMI network without eliminating the function of the HDMI network (system) as a whole. The embodiment realizes the low power consumption while maintaining the function of the HDMI network.

In the case where power of the STB 2 connected to the television receiver 1 has not been turned ON, the ACK response is not returned to the television receiver 1 from the STB 2. The determination whether or not the power of the connected external unit has been ON may be made by confirming existence of the ACK response from the external unit. In the embodiment, if the power of the external unit with the function overlapped with the inner function of the television receiver 1, which is actually connected thereto has been OFF (inactive state), there is no ACK response returned from the external unit. Accordingly, the power of the inner function of the television receiver 1, which is overlapping with that of the external unit is not turned OFF. The aforementioned structure avoids the case where the overlapping functions in the HDMI network cannot be used simultaneously.

In the aforementioned embodiment, the power supply both to the analog receiver circuit 12 and the digital receiver circuit 13 is stopped. The STB 2 provided only with the digital receiver circuit 13 may be introduced accompanied with the prevailing digital broadcasting, and accordingly, the power supply circuit 18c may be controlled to stop the power supply only to the digital receiver circuit 13.

If the external unit has not only the tuner function but also the other function (for example, recorder) (Yes in step S107), the tuner 21 of the external unit and the tuner 11 of the television receiver may be used for the different purposes. In the embodiment, if the external unit includes the tuner and the other function, the user is allowed to determine whether the tuner of the television receiver 1 is to be selected in steps S108 and S109.

FIG. 4 is a view showing an example of the tuner selection screen. The screen shows that the connected external unit is identified as the tuner, and is made available with the tuner of the television receiver. The message which allows the user to select any one of the tuners is displayed. If the user selects the external unit for reception, the power supply to the tuner of the television receiver is stopped so as to be brought into the power saving state.

In the embodiment, the power saving control in the case where the external unit with the same function as that of the tuner installed in the television receiver has been described. The overlapping devices of the television receiver and the external unit may be the monitors, speakers, HDDs and DVDs besides the tuners, the type of which is expected to be increased. In such a case, the power saving control according to the embodiment may be applied while being extended. For example, in the case where the speaker is connected as the external unit, the power supply circuit 18d shown in FIG. 1 is controlled to stop the power supply to the audio output circuit 16. In the case where the external unit is the HDD recorder and the television receiver 1 has a build-in HDD record/replay function, the power supply to the HDD record/replay function of the television receiver 1 may be stopped. In the embodiment, the use of the logical address specified by the HDMI allows accurate identification with respect to the external unit and the function thereof. This makes it possible to be rationally applied to the diversified device.

The use of the control signal of the HDMI allows the control of the connected external unit. When the devices (functions) of the subject unit and the external unit are overlapped, the power may be applied to the device of the subject unit and the power supply to the device of the external unit may be cut. The user is allowed to select the device having the power supply cut. This makes it possible to improve the power saving in the entire system and usability of the user.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A television receiver for receiving a television broadcasting comprising:

a tuner which receives a television broadcast signal to select a channel;

a video/audio process circuit which generates a video/audio signal by processing the broadcast signal of the selected channel;

an external unit connection portion which connects an external unit using a high-definition multimedia interface (HDMI) cable;

an HDMI process unit which acquires unit information from the connected external unit, and communicates with the external unit with respect to video/audio data;

a power supply circuit which supplies power to the tuner; and a control unit which controls the HDMI process unit and the power supply circuit, wherein when the HDMI process unit determines that the connected external unit has the same function as that of the tuner, the control unit allows the power supply circuit to stop the power supply to the tuner.

2. The television receiver according to claim 1, wherein when the HDMI process unit determines that the connected external unit includes a function other than the tuner, the control unit allows a user to select one of the tuners of the television receiver and the external unit, and allows the power supply circuit to stop the power supply to the tuner of the television receiver when the user selects the external unit.

3. The television receiver according to claim 1, wherein the HDMI process unit acquires a logical address indicating a type of the unit as unit information of the external unit to determine whether or not the unit includes the same function as that of the tuner.

4. The television receiver according to claim 1, further comprising at least one of devices including a monitor, a speaker, an HDD and a DVD in addition to the tuner, and a power supply circuit which supplies power to the device individually, wherein when the HDMI process unit determines that the connected external unit has the same function as that of the device, the control unit controls the power supply circuit to stop supplying power to the device which has the function overlapped with that of the external unit.

5. The television receiver according to claim 1, further comprising at least one of devices including a monitor, a speaker, an HDD and a DVD in addition to the tuner, and a power supply circuit which supplies power to the device individually, wherein:

when the HDMI process unit determines that the connected external unit has the same function as that of the device, the control unit allows a user to select one of the devices of the television receiver and the external unit with the same function; and when the user selects the external unit, the control unit controls the power supply circuit to stop supplying the power to the device with the function overlapped with that of the external unit.

* * * * *